United States Patent [19]

Rambold

[11] Patent Number: 4,986,455
[45] Date of Patent: Jan. 22, 1991

[54] ARRANGEMENT FOR SUPPLYING AND DOSING LOOSE FILLING MATERIAL

[75] Inventor: Adolf Rambold, Meerbusch, Fed. Rep. of Germany

[73] Assignee: Teepack Spezialmaschinen GmbH & Co. KG, Meerbusch, Fed. Rep. of Germany

[21] Appl. No.: 215,557

[22] Filed: Jul. 6, 1988

[51] Int. Cl.$^5$ .............................................. G01F 11/10
[52] U.S. Cl. ..................................... 222/368; 222/345; 222/564
[58] Field of Search ................ 222/312, 314, 317, 368, 222/367, 345, 344, 353, 460, 547, 564

[56] References Cited

U.S. PATENT DOCUMENTS

| 3,118,575 | 1/1964 | McCauley | 222/368 |
| 3,138,296 | 6/1964 | Neidhardt | 222/564 |
| 4,667,857 | 5/1987 | Song | 222/564 |

FOREIGN PATENT DOCUMENTS 2344782  3/1974  Fed. Rep. of Germany ...... 222/564

Primary Examiner—H. Grant Skaggs
Assistant Examiner—Kenneth Noland
Attorney, Agent, or Firm—Michael J. Striker

[57] ABSTRACT

An arrangement for supplying and dosing a loose filling material comprises a dosing wheel rotatable in a predetermined direction and having a plurality of dosing chambers movable along a movement path, forming a filling chamber arranged above the movement path of the dosing chamber and limited from below by the dosing wheel and in the direction of rotation by an end wall having a lower edge, a stripper arranged in the region of the lower edge and abutting against the dosing wheel. Means is provided for substantially maintaining a constant filling pressure over a whole opening cross-section of the filling chamber, the maintaining means including a plurality of members having a stepped configuration and disposed on the end wall of the filling chamber, the members being varied in height in response to variations of filling pressure of the filling chamber, so that the filling pressure substantially remains constant by varying the volume of the filling chamber.

2 Claims, 2 Drawing Sheets

ARRANGEMENT FOR SUPPLYING AND DOSING LOOSE FILLING MATERIAL

BACKGROUND OF THE INVENTION

The present invention relates to an arrangement for supplying and dosing a loose filling material with the use of a dosing wheel having a plurality of dosing chambers.

Arrangements of the above mentioned general type are known in the art. One of such arrangements is disclosed for example in the German document DE-OS 2,928,521. In this arrangement prior to the end wall which limits the filling chamber as considered in the rotary direction of the dosing wheel, a plurality of intermediate walls are provided which are arranged at distances from one another. They form with the dosing wheel a plurality of passages with reduced height as considered in the rotary direction. The excessive filling material must strip on these intermediate walls and is so accumulated so that in the thus formed intermediate spaces so-called post-filling material columns are formed. During the filling process they must act in a regulating manner on the filling pressure for preventing a dosing error and eliminating a subsequent whirling in the region of the stripper.

The expected action of this construction has not been however confirmed in practice, since the excessive filling material is stopped relatively soon in the inlet region of the intermediate spaces, so that the intermediate spaces no longer take the excessive filling material or take it in a not satisfactory manner. The excessive filling material therefore forms an artificial dam wall in the region of the passages of this type. It reduces the filling space in direction of the stripper in an increasing fashion and can untrontrollably increase the filling pressure.

Filling devices are further disclosed in the U.S. Pat. No. 4,053,088. In this patent the loose material is supplied from a distributing chamber by means of a cell wheel. The peripheral surface of the cell wheel is formed as a chamber wall and a passage is formed above the cell wheel with a height which is adjustable by means of a slider. In the event of completely closed slider, the loose material stream can be limited by the quantity determined by the volume of an individual chamber of the cell wheel. Its dosability is however dependent on the pressure variation inside the distributor chamber.

SUMMARY OF THE INVENTION

Accordingly, it is an object of the present invention to provide an arrangement of the above mentioned general type which avoids the disadvantages of the prior art.

More particularly, it is an object of the present invention to provide an arrangement of the above mentioned general type, which insures that a filling pressure is permanently controllable as to its height over substantially the whole region of the lower opening of the filling chamber.

In keeping with these objects and with others which will become apparent hereinafter, one feature of the present invention resides, briefly stated, in that an outer surface of an end wall which limits the filling chamber is stepped in a stair-like manner and the arrangement has means for substantially maintaining a constant filling pressure over the whole opening cross-section of the filling chamber. Such a means consists of a plurality of members having a stepped configuration and disposed on the end wall of the filling chamber.

Because of the stair-like stepping of the outer surface of the end wall which limits the filling chamber, the filling material pressure reduces in direction of the peripheral surface of the dosing wheel approximately with such magnitude which corresponds to the increase of the ramming pressure which is dependent on the rotary speed of the dosing wheel. The members are varied in height in response to variations of filling pressure of the filling chamber. As a result of this, the resulting filling pressure remains substantially the same over the whole opening cross-section of the filling chamber. Simultaneously the offsetlike stepping of the filling chamber prevents whirling formation which can lead to demixing or even destruction of the filling material.

A further advantageous feature of the present invention provides for the possibility to guarantee accurate and fine dosing of filling materials which are different in their surface structure and specific weight.

In accordance with another feature of the present invention, the steps are closed by the stripper, and the stripper extends inclinedly inwardly in the filling chamber so as to extend at least over the depth of the last step into the interior of the filling chamber.

In accordance with a further feature of the present invention, the steps of the outer surface of the end wall of the filling chamber can have identical depths and different heights. It is also possible that the individual steps have different depths.

Still a further feature of the present invention is that at least one of the steps of the outer surface of the end wall of the filling chamber is height adjustable. Preferably two steps which are located near the stripper can be height-adjustable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
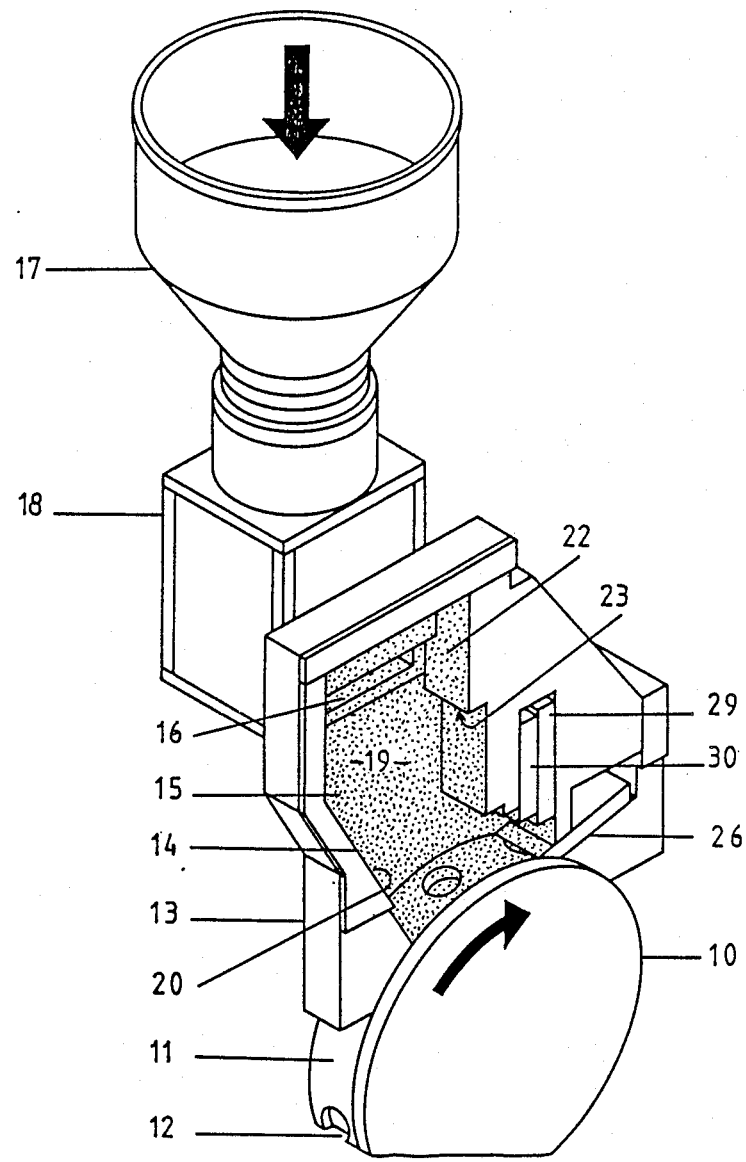
FIG. 1 is a view showing an arrangement for supplying and dosing a loose filling material in accordance with the present invention.

FIG. 1 shows an arrangement for supplying and dosing loose filling material, which is for example a part of conventional tea bag packing machine used for filling and closing pouring bags. The arrangement has substantially a dosing wheel 10 which is rotatable about a horizontal axis in a clockwise direction. The dosing wheel 10 has a plurality of dosing chambers 12 which are uniformly distributed over its peripheral surface 11. A housing 13 with a filling chamber 14 is arranged above the movement path of the dosing chambers 12. The filling chamber 14 is open upwardly and closed by a peripheral surface 11 of the dosing wheel. The depth of the filling chamber 14 corresponds to the width of the peripheral surface 11 of the dosing wheel 10. For the sake of clarity of illustration, a side wall which closes the filling chamber on the plan view is not shown in the drawings. An opposite side wall 15 is provided in its upper part with an inlet opening 16. A filling material 19 for example finely cut leaf tea, is fed through the inlet opening 16 into the filling chamber through a pre-filling funnel 17 and a subsequently arranged supply chamber 18.

Figure 2:
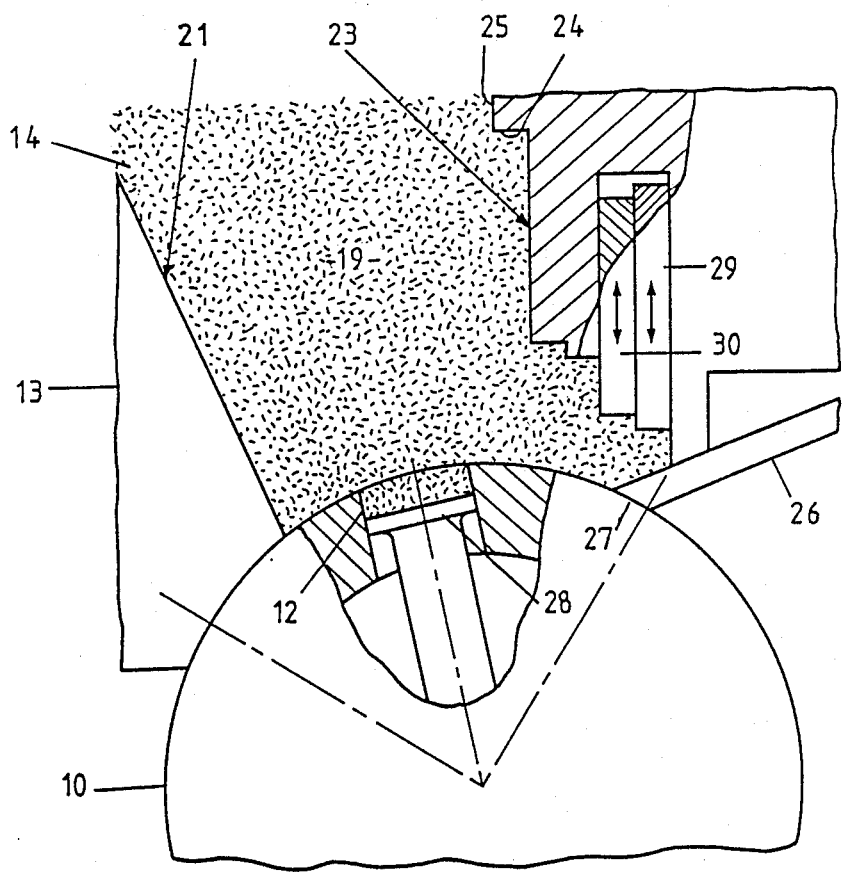
FIG. 2 is a view showing a part of the inventive arrangement of FIG. 1, on an enlarged scale.

The front end wall 20 of the filling chamber 14 has a substantially smooth surface and is provided in its lower part with a wall region 21 which extends approximately perpendicularly to the peripheral surface 11 of the dosing wheel 10. As can be seen from FIG. 2, an end wall 22 which limits the filling chamber 14 in direction of rotation of the dosing wheel 10 is stepped in a stair-like manner. The steps have substantially horizontally oriented step surfaces 24 and vertical end surfaces 25. In the shown embodiment, the individual steps have preferably identical depths in a horizontal direction and different heights in a vertical direction.

At the lower edge of the end wall 22, a so-called stripper 26 is arranged in a longitudinally displaceable manner. It extends at least over the depth of the last step 29 in an inclined fashion in the interior of the filling chamber 14. A cutting edge 27 is formed at its free end. The cutting edge abuts against the peripheral surface 11 of the dosing wheel 10 and cooperates with the upper edge of the dosing chamber 12 so that the excessive filling material 19 can be cut off from the upper edge of the dosing chamber 12. The volume of the dosing chamber 12 can be changed in a known manner by means of a height adjustable bottom part 28.

The steps extend to an immediate proximity to the stripper 26 and end with a vertical end surface which has a height dimensioned so that above the stripper 26 a sufficient free space remains for the excessive filling material 19. Advantageously, the last step 29 and the preceding step 30 are arranged in a height adjustable manner, so that when needed, not only the step ratio, but also the available free space can be changed as to its shape and volume.

It is to be understood that both the number and arrangement of the height adjustable steps can be varied in any desired manner. It is also recommended that the individual steps can be formed with different depths.

In accordance with a further embodiment of the invention which is not described in detail, the dosing wheel 10 can be formed as a disc-shaped plate which rotates about a vertical axis. The dosing chambers 12 can be arranged then in the upper surface of the plate, or can be suspended in form of cups on the lower surface of the plate. As for the arrangement of the housing 13 and the shape of the filling chambers 14, they can be the same as in the embodiment shown in FIGS. 1 and 2.

It will be understood that each of the elements described above, or two or more together, may also find a useful application in other types of constructions differing from the types described above.

While the invention has been illustrated and described as embodied in an arrangement for filling and dosing a loose filling material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for supplying and dosing a loose filling material, comprising a dosing wheel rotatable in a predetermined direction and having a plurality of dosing chambers movable long a movement path; means forming a filling chamber arranged above the movement path of said dosing chamber and limited from below by said dosing wheel and also limited in direction of rotation by an end wall having a lower edge; a stripper arranged in the region of said lower edge and abutting against said dosing wheel; and means for substantially maintaining a constant filling pressure over a whole opening cross-section of said filling chamber, said maintaining means including a plurality of members having a stepped configuration and disposed on said end wall of said filling chamber, said members being varied in height in response to variations of filling pressure of said filling chamber, so that the filling pressure substantially remains constant by varying the volume of said filling chamber.

2. An arrangement as defined in claim 1, wherein said dosing wheel has a peripheral surface, said dosing chambers being arranged on said peripheral surface of said dosing wheel one behind the other.

* * * * *